(12) United States Patent
Tanaka

(10) Patent No.: US 11,584,091 B2
(45) Date of Patent: Feb. 21, 2023

(54) METHOD OF PRODUCING METAL MEMBER, METHOD OF PRODUCING RESIN MEMBER, AND METHOD OF PRODUCING EXTERIOR PART

(71) Applicant: TEIJIN LIMITED, Osaka (JP)

(72) Inventor: Yoshitaka Tanaka, Tokyo (JP)

(73) Assignee: TEIJIN LIMITED, Osaka (JP)

( * ) Notice: Subject to any disclaimer, the term of this patent is extended or adjusted under 35 U.S.C. 154(b) by 372 days.

(21) Appl. No.: 16/756,949

(22) PCT Filed: Oct. 22, 2018

(86) PCT No.: PCT/JP2018/039237
§ 371 (c)(1),
(2) Date: Apr. 17, 2020

(87) PCT Pub. No.: WO2019/078369
PCT Pub. Date: Apr. 25, 2019

(65) Prior Publication Data
US 2021/0187868 A1    Jun. 24, 2021

(30) Foreign Application Priority Data

Oct. 20, 2017   (JP) .............................. JP2017-203464

(51) Int. Cl.
*B29C 65/44*   (2006.01)
*B29C 43/20*   (2006.01)
(Continued)

(52) U.S. Cl.
CPC ............ *B29C 65/44* (2013.01); *B29C 43/203* (2013.01); *B29C 45/14* (2013.01);
(Continued)

(58) Field of Classification Search
CPC .......... B32B 2605/00; B32B 2307/402; B32B 2255/06; B32B 37/24; B32B 15/18;
(Continued)

(56) References Cited

U.S. PATENT DOCUMENTS

| 2004/0005436 A1* | 1/2004 | Mori ........................ G02B 1/11 |
| | | 428/141 |
| 2004/0131864 A1* | 7/2004 | Ohgane ...................... C09J 7/29 |
| | | 428/423.1 |

(Continued)

FOREIGN PATENT DOCUMENTS

| EP | 2 881 253 | 6/2015 |
| JP | 63-123469 | 5/1988 |

(Continued)

OTHER PUBLICATIONS

Machine translation of JP 09-295348 A; Publication Nov. 18, 1997.*

(Continued)

*Primary Examiner* — Vishal I Patel
(74) *Attorney, Agent, or Firm* — Wenderoth, Lind & Ponack, L.L.P.

(57) ABSTRACT

Provided are a method of producing a metal member, a method of producing a resin member, and a method of producing an exterior part of a vehicle, each using a laminated body including a paint substitute film that includes a thermoplastic resin film, a colored layer, and a semi-cured hard coat layer, in this order, and a protective film that is bonded to a surface of the semi-cured hard coat layer. (1) The method of producing a metal member uses a steel plate together with the laminated body, and includes: a molding step of performing thermocompression bonding on the laminated body and the heated steel plate and performing press-molding while curing the semi-cured hard coat layer. (2) The method of producing a resin member uses a molten resin together with the laminated body, and includes: inserting the (Continued)

laminated body into a mold; performing in-mold molding by performing injection-molding using the molten resin; and curing the semi-cured hard coat layer after the insertion into the mold and until the in-mold molding ends. (3) The method of producing an exterior part of a vehicle includes combining the metal member produced by the above-described method, and the resin member produced by the above-described method.

20 Claims, 3 Drawing Sheets

(51) Int. Cl.
*B29C 45/14* (2006.01)
*B29C 65/00* (2006.01)
*B32B 15/08* (2006.01)
*B32B 15/18* (2006.01)
*B32B 37/24* (2006.01)
*B29L 31/30* (2006.01)

(52) U.S. Cl.
CPC ........ *B29C 66/74283* (2013.01); *B32B 15/08* (2013.01); *B32B 15/18* (2013.01); *B32B 37/24* (2013.01); *B29K 2995/002* (2013.01); *B29L 2031/30* (2013.01); *B32B 2255/06* (2013.01); *B32B 2307/402* (2013.01); *B32B 2605/00* (2013.01)

(58) Field of Classification Search
CPC ........... B29L 2031/30; B29K 2995/002; B29C 66/74283; B29C 45/14; B29C 43/203; B29C 65/44

See application file for complete search history.

(56) References Cited

U.S. PATENT DOCUMENTS

| 2017/0203608 A1 | 7/2017 | Shibata et al. |
| 2019/0077134 A1* | 3/2019 | Konno ................... B32B 25/06 |

FOREIGN PATENT DOCUMENTS

| JP | 09-183136 | 7/1997 |
| JP | 09-295348 | 11/1997 |
| JP | 10-151699 | 6/1998 |
| JP | 2001-145981 | 5/2001 |
| JP | 2002-205317 | 7/2002 |
| JP | 2012-179773 | 9/2012 |
| JP | 2014-128937 | 7/2014 |
| WO | 2017/051539 | 3/2017 |

OTHER PUBLICATIONS

Machine translation of JP 2001-145981 A; Publication May 29, 2001.*
Machine translation of JP 2012179773 A; Publication Sep. 20, 2012.*
International Search Report dated Jan. 15, 2019 in International (PCT) Application No. PCT/JP2018/039237.

* cited by examiner

METHOD OF PRODUCING METAL MEMBER, METHOD OF PRODUCING RESIN MEMBER, AND METHOD OF PRODUCING EXTERIOR PART

TECHNICAL FIELD

The present disclosure relates to a producing method in which a component such as an outer plate of a vehicle such as an automobile is coated with a paint substitute film, instead of being painted.

BACKGROUND ART

Conventionally, spray painting has been generally used to improve the design of vehicle exterior parts and the like (for example, resin-molded articles such as a fender, a bumper, a bonnet, and a wheel cap). However, a large facility and space are required to repeatedly perform painting and drying in a painting process including such a spray painting, and thus productivity is reduced. Therefore, in recent years, a method of improving the appearance of a product by bonding a decorative film (hereinafter, referred to as a paint substitute film) to the exterior part has been studied.

This type of paint substitute film 1 according to the related art is, for example, a film in which a clear layer 19, a colored layer 12, and an adhesive layer 14 are layered, in this order, as shown in FIG. 6, and is described in, for example, Japanese Patent Application Laid-Open No. S63-123469 and Japanese Patent Application Laid-Open No. H09-183136.

Here, the clear layer 19 is formed by using, for example, a highly transparent resin material such as polyurethane, acrylic resin, polyester resin, silicon-based resin, polyvinyldene fluoride (PVDF), or any mixture thereof, and has functions such as protection of the colored layer 12 and polishing. The colored layer 12 is formed by blending a metallic pigment in substantially the similar resin material to that of the clear layer 19 to implement an appearance in a metallic color that is similar to that may be obtained by the spray painting. Further, the adhesive layer 14 is for adhering the paint substitute film 1 to a surface of an exterior part of an automobile or the like.

In the case of adhering the paint substitute film 1 to the exterior part or the like, the paint substitute film 1 is heated in advance by infrared lamp irradiation or the like, and then the paint substitute film 1 is molded by in-mold molding, vacuum molding, or the like so as to fit the surface shape of the exterior part and is bonded to the surface of the exterior part by the adhesive layer 14. Here, in the case of bonding the paint substitute film 1, the paint substitute film 1 is stretched so as to fit the contour of a mold or the exterior part while maintaining a layer structure shown in FIG. 6(a), and then is bonded to the exterior part.

SUMMARY OF INVENTION

Technical Problem

As shown in FIG. 6, the paint substitute film 1 is bonded through the adhesive layer 14 in the related art.

However, in the case of bonding the paint substitute film 1 so as to fit a complex shape such as an exterior part of an automobile or the like, since the paint substitute film 1 is partially stretched greatly at a curved surface portion or the like, and is fixed by using an adhesive in a state of being distorted due to such stretching, the following problem occurs.

That is, in a case in which the paint substitute film 1 is bonded to an exterior part or the like, once the paint substitute film 1 is bonded by using an adhesive while being stretched, a bonding force between a substrate and the paint substitute film is locally strong and weak. As a solution to this problem, it is effective to select an adhesive having an excellent adhesiveness to the substrate to be bonded. However, exterior parts of a vehicle include a member (resin member) formed of a resin and a member formed of a metal (metal member), and it is substantially impossible to select an adhesive that exhibits an excellent adhesive force to any member.

An embodiment of the disclosure is to provide a method of producing a resin member, a method of producing a metal member, and a method of producing an exterior part, which can implement an excellent adhesive force to various members, and implement a durable and excellent decoration required for an exterior part of a vehicle. Another embodiment of the disclosure is to omit a painting process for a vehicle by combining the producing methods according to an embodiment of the disclosure.

Solution to Problem

The present inventor first studied selection of an adhesive, and could find a material that could cope with a specific shape or material. However, the inventor could not find a material that could cope with various shapes or materials. Therefore, as a result of studying whether or not the bonding of the paint substitute film can be performed without relying on the adhesive, it has been found that the adhesive force can be secured by specific in-mold molding or thermocompression bonding. However, the mere adoption of these methods could not implement the durable and excellent appearance required for the paint substitute film. Therefore, the inventor conducted intensive research on a method of producing an exterior part, and as a result, the disclosure has been completed.

According to an embodiment of the disclosure, a method of producing a metal member including (1) to (3) below, a method of producing a resin member including (4) to (6) below, and a method of producing an exterior part including (7) to (14) below are included.

(1) A method of producing a metal member, which is used as an exterior part of a vehicle, the method including:

a molding step of:

by using a laminated body including a paint substitute film that includes a thermoplastic resin film, a colored layer, and a semi-cured hard coat layer, in this order, and a protective film that is bonded to a surface of the semi-cured hard coat layer, and using a steel plate, performing thermocompression bonding on the laminated body and the steel plate, which has been heated, and performing press-molding while curing the semi-cured hard coat layer.

(2) The method of producing a metal member according to (1), wherein, in the molding step, a side of the laminated body on which the paint substitute film is present is bonded to the heated steel plate by thermal fusion bonding.

(3) The method of producing a metal member according to (1), wherein, in a case of bonding a side of the paint substitute film on which the thermoplastic resin film is present to the heated steel plate, the paint substitute film is cooled from a protective film side.

(4) A method of producing a resin member, which is used as an exterior part of a vehicle, the method including:

by using a laminated body including a paint substitute film that includes a thermoplastic resin film, a colored layer, and a semi-cured hard coat layer, in this order, and a protective film that is bonded to a surface of the semi-cured hard coat layer, and using a molten resin, inserting the laminated body into a mold, performing in-mold molding by performing injection-molding using the molten resin, and curing the semi-cured hard coat layer after insertion into the mold and until the in-mold molding ends.

(5) The method of producing a resin member according to (4), wherein a resin injected in the injection-molding is at least one selected from the group consisting of a polyolefin resin, a polyamide resin, a polycarbonate resin and a polyphenylene sulfide resin.

(6) The method of producing a resin member according to (5), wherein the polyolefin resin includes a polypropylene resin.

(7) A method of producing an exterior part of a vehicle, including:

combining the metal member produced by the method according to any one of (1) to (3), and the resin member obtained by the method according to any one of (4) to (6).

(8) The producing method according to any one of (1) to (7), wherein the protective film shows a main peak of a ratio (tan δ) between a storage modulus and a loss modulus in dynamic viscoelasticity measurement at a temperature of 80° C. or higher.

(9) The producing method according to any one of (1) to (7), wherein the semi-cured hard coat layer of the paint substitute film contains a thermosetting resin.

(10) The producing method according to (9), wherein the thermosetting resin includes an acrylic resin.

(11) The producing method according to any one of (1) to (7), wherein the colored layer of the paint substitute film contains a binder resin and a coloring agent.

(12) The producing method according to (11), wherein the coloring agent is at least one selected from the group consisting of a carbon black (India ink), an iron black pigment, a titanium white pigment, an antimony white pigment, a chrome yellow pigment, a titanium yellow pigment, a Bengal red pigment, a cadmium red pigment, an ultramarine pigment, a cobalt blue pigment, a quinacridone red pigment, an isoindolinone yellow pigment, a phthalocyanine blue pigment, an aluminum pigment, a brass pigment, a titanium dioxide pigment and a pearlescent pigment.

(13) The producing method according to any one of (1) to (7), wherein the thermoplastic resin film in the paint substitute film contains at least one selected from the group consisting of a polyolefin resin, a polyamide resin, an acrylic resin, a polyester resin, a polycarbonate resin and a polyarylene sulfide resin.

(14) The producing method according to (13), wherein the thermoplastic resin film does not include an adhesive layer having a thickness of more than 1 μm.

Advantageous Effects of Invention

According to an embodiment of the disclosure, it is possible to provide the method of producing a resin member, the method of producing a metal member, or the method of producing an exterior part, which can implement an excellent adhesive force to various members, and implement a durable and excellent decoration required for an exterior part of a vehicle. Further, according to another embodiment of the disclosure, it is possible to omit a painting process for a vehicle by combining the producing methods according to an embodiment of the disclosure.

DESCRIPTION OF EMBODIMENTS

Figure 1:
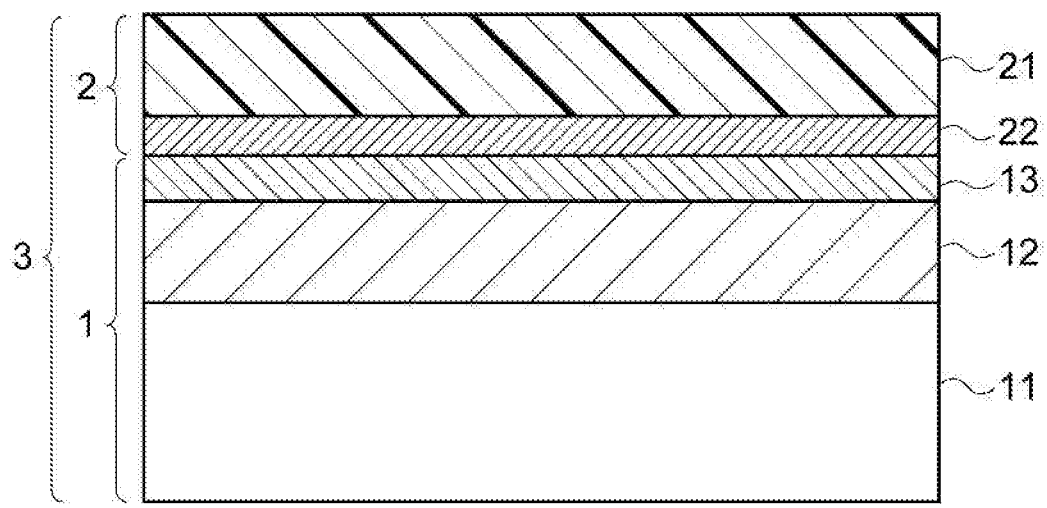
FIG. 1 is a partially enlarged cross-sectional view of a laminated body in which a paint substitute film and a protective film used in the disclosure are layered.

A producing method according to an embodiment of the disclosure is a method of producing a metal member, which is used as an exterior part of a vehicle, the method including: a molding step of, by using a laminated body including a paint substitute film that includes a thermoplastic resin film, a colored layer, and a semi-cured hard coat layer, in this order, and a protective film that is bonded to a surface of the semi-cured hard coat layer, and using a steel plate, performing thermocompression bonding on the laminated body and the steel plate, which has been heated, and performing press-molding while curing the semi-cured hard coat layer.

A producing method according to an embodiment of the disclosure is a method of producing a resin member, which is used as an exterior part of a vehicle, the method including: by using a laminated body including a paint substitute film that includes a thermoplastic resin film, a colored layer, and a semi-cured hard coat layer, in this order, and a protective film that is bonded to a surface of the semi-cured hard coat layer, and using a molten resin, inserting the laminated body into a mold, performing in-mold molding by performing injection-molding using the molten resin, and curing the semi-cured hard coat layer after insertion into the mold and until the in-mold molding ends.

A producing method according to an embodiment of the disclosure is a method of producing an exterior member of a vehicle, the producing method including: combining the metal member produced by the above-described producing method and the resin member produced by the above-described producing method.

As described above, in the case of producing a resin member and a metal member by adhering using an adhesive, it is necessary to select an adhesive having an excellent adhesiveness to both the resin member and the metal member. Considering the durability of an exterior part of a vehicle, an adhesive capable of maintaining an excellent adhesive force to both the resin member and the metal member is required, but the technical barrier is high.

The in-mold molding, which is a known method of preparing a resin member, is a thermocompression bonding technique in which a sheet using a material chemically similar or equivalent to a base resin is used in a molten state.

Therefore, an exterior part of a vehicle molded by the in-mold molding, such as a wheel cap and an emblem, is practically usable. Although the adhesiveness of the resin member can be ensured by thermocompression bonding, the resin member has been conventionally subjected to spray painting after the molding in order to obtain a beautiful appearance.

The inventors thought that it may be possible to perform the molding while covering the surface of the resin member with the protective film to prevent a damage for a beautiful appearance, and found out that a beautiful and excellent appearance can be obtained even after the molding by further performing a heat treatment on the semi-cured hard coat layer to promote a curing reaction in the second stage. Furthermore, a painting process that has been performed subsequently according to the related art can be simplified by using the producing method according to the disclosure.

It is presumed that the items described in the producing method (1) or (4) are important in order to simplify the painting process. Meanwhile, there has been a demand for lighter weight for environmental reasons, as exterior parts of a vehicle, metal members are used in addition to resin members because safety or traveling stability required for a vehicle is related to stiffness of a metal. Therefore, in order to omit the painting process, a paint substitute film that can be used for a metal as well is required first.

Generally, in a case in which a raw steel plate is used, the metal is immediately oxidized in the air, and rusts. It is common that a zinc alloy plated steel plate, an iron-nickel alloy plated steel plate, or the like is formed by applying a plating film to a steel plate to form a uniform surface, and a treatment with rust-preventing oil is performed to prevent chemical denaturalization during storage or transportation, in order to prevent such a problem. In an actual implementation, treatment for long-lasting rustproof is performed by further performing zinc-phosphate plating by electrodeposition coating.

One of the reasons why it is difficult to firmly adhere to a metal surface using an adhesive is that, for example, physical and chemical properties of a surface state are not constant. In other words, even in the case of a metal member formed in a three-dimensional shape by using the same plated iron plate, the surface roughness changes due to a heat at the time of molding, the degree of molding, and a storage environment, or oxidation proceeds chemically, whereby adhesive force unevenness is caused. Further, as described above, even in a case in which an adhesive can firmly adhere to a metal surface, it is difficult for an adhesive similar thereto to firmly adhere to a resin member.

It is necessary to adhere to a metal member having a surface as uniform as possible with a uniform and strong adhesive force in order to be able to maintain a strong adhesive force in an environment where long-term use is expected, such as a vehicle. According to the method of adhering to a metal according to (1), in a case in which the metal is wound in a coil shape, that is, in a case in which the metal is in a state before being subjected to molding, it is possible to adhere without coping with a difference in molding. Furthermore, a strong adhesive force can be uniformly provided by performing thermocompression bonding as in the in-mold molding for the resin member described above.

In the case of the metal member used as an exterior part of a vehicle, it is sufficient to adopt a condition in which the laminated body does not entirely melt, but at least a surface of the thermoplastic resin film in the laminated body that is in contact with the metal member melts. From such a viewpoint, cold working is preferable as processing of the metal member. As for controlling of a degree of molding in a cold press method, it was found out that a resin film can firmly adhere to a steel plate even after press-molding by bonding a resin layer in advance by thermocompression bonding because the degree of elongation of a metal is lower even at room temperature.

Hot press or in-mold molding per se has been conventionally known, but the painting process can be omitted by using the above-mentioned paint substitute film.

EXAMPLE

Hereinafter, the method of producing a metal member, the method of producing a resin member, and the method of producing an exterior part according to the disclosure will be specifically described. First, the laminated body of the disclosure includes the paint substitute film and the protective film. FIGS. 1 to 5 are each a partially enlarged cross-sectional view of a laminated body in which a paint substitute film and a protective film used in the disclosure are layered, and the laminated body used in the disclosure is not limited to those shown in FIGS. 1 to 5, and, for example, any combination thereof can be suitably used.

Figure 6:
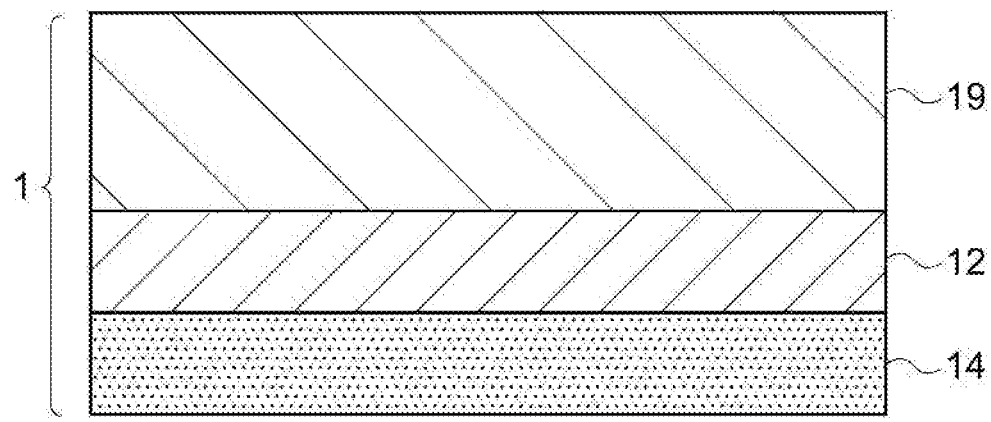
FIG. 6 is a partially enlarged cross-sectional view of a paint substitute film used in a producing method according to the related art.

First, as shown in FIG. 1, a paint substitute film 1 in an embodiment of the present embodiment is different from the paint substitute film 1 according to the related art illustrated in FIG. 6, and a thermoplastic resin film 11 of the paint substitute film is thermally fusion bonded to a resin substrate or a metal substrate. The paint substitute film 1 does not have to include an adhesive layer 14 formed of an adhesive as in the related art. It is preferable that the thermoplastic resin film 11 in the paint substitute film does not include an adhesive layer having a thickness of more than 1 μm, because a defect caused by the adhesive layer in the related art occurs, that is, durability easily decreases due to deterioration of the adhesive layer.

Hereinafter, the paint substitute film 1, the protective film 2, and the laminated body 3 used in the producing method of the disclosure will be described in detail.

[Paint Substitute Film]

The paint substitute film 1 used in the disclosure includes a thermoplastic resin film 11, a colored layer 12, and a semi-cured hard coat layer 13, and does not have to be provided with a layer formed of a resin composition generally used as an adhesive. It is preferable not to provide an adhesive layer having a thickness of 1 μm or more, from the viewpoint of durability. The thermoplastic resin film 11 can have an adhesive force as a thermoplastic resin is melted due to heat generated when the resin member is molded or is melted when the thermoplastic resin is laminated on a steel plate, and then solidified again by cooling.

The paint substitute film 1 in the disclosure includes the thermoplastic resin film 11, the colored layer 12, and the semi-cured hard coat layer 13, in this order, and may include another function layer such as a surface-modified layer 15, a surface-modified layer 16, an antifouling layer 17, or a bright-material layer 18. In particular, since the thermoplastic resin film 11 of the paint substitute film is thermally fusion bonded to the resin substrate or the metal substrate, even in a case in which a surface of the exterior part is damaged, peeling of the paint substitute film from the damage is suppressed.

On the other hand, in a case in which the paint substitute film is bonded using an adhesive, since the thermoplastic resin film itself is not thermally fusion bonded, an adhesive force is decreased once a surface of the exterior part is damaged, and the paint substitute film itself has a high breaking strength and elongation in a plane direction, and thus peeling of the paint substitute film from the damage easily occurs. In addition, it becomes possible to apply the colored layer again at the time of repairing an outer plate of a vehicle.

Figure 4:
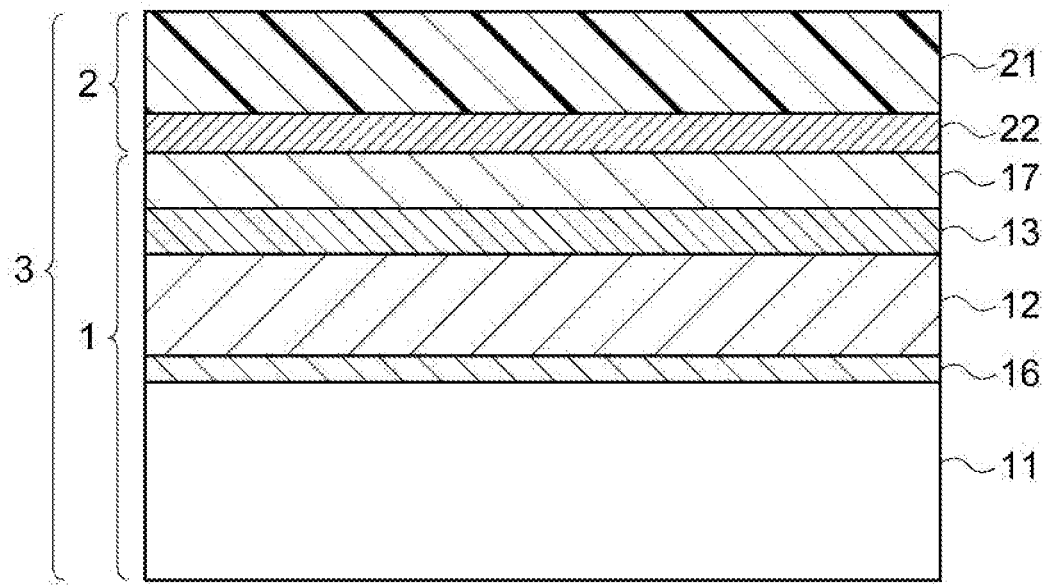
FIG. 4 is a partially enlarged cross-sectional view of a laminated body in which another paint substitute film and the protective film used in the disclosure are layered.
Figure 5:
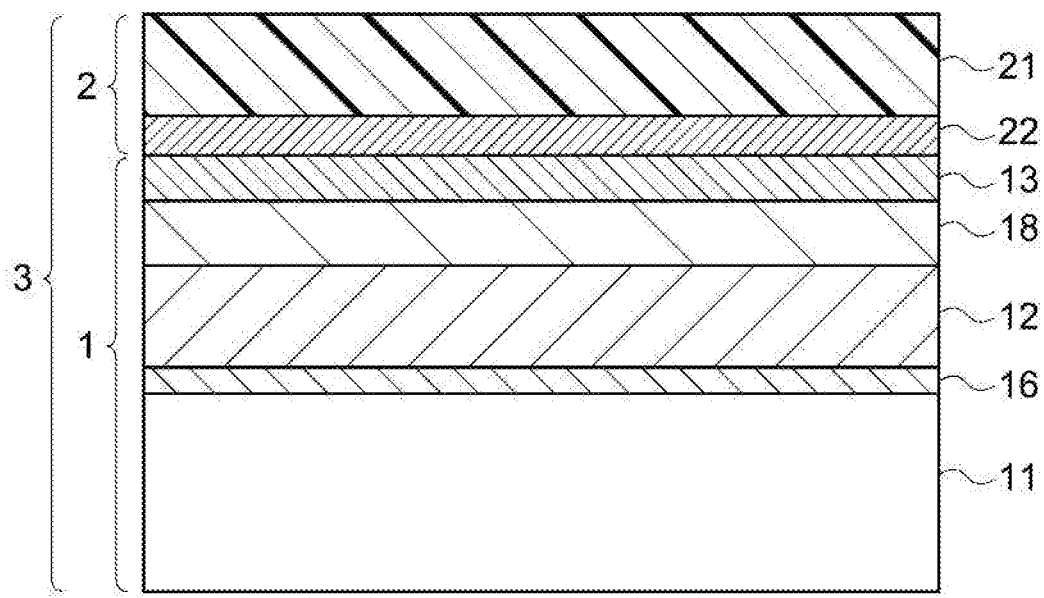
FIG. 5 is a partially enlarged cross-sectional view of a laminated body in which another paint substitute film and the protective film used in the disclosure are layered.

Further, in the case of being used for an exterior of a vehicle, a multilayer colored layer may be provided to implement a beautiful design. For example, it may be preferable that a two-layer colored layer is provided by providing, as the bright-material layer 18, a colored layer 12 in which a binder resin contains a bright-material pigment on a colored layer formed of a pigment as illustrated in FIG. 5, and it is preferable that a three-layer colored layer as a bright-material pigment layer 18 is layered on a side of the colored layer that is most adjacent to the thermoplastic resin film 11, the three-layer colored layer including a colored reflection layer formed of an aluminum pigment, a colored pigment layer, and a clear coating film. As long as a desired design is implemented, the use of a monolayer colored layer or a multilayer colored layer does not deny the purpose of the disclosure. The paint substitute film 1 may be formed as a multilayer by layering a thermoplastic resin or a semi-cured hard coat layer, if necessary. As shown in FIG. 4, as the antifouling layer is layered as an uppermost layer, it is possible to exhibit an effect that a function of avoiding attachment of dirt can be imparted in a case in which the paint substitute film 1 is used for, for example, an exterior of a vehicle. It is preferable that the paint substitute film 1 has a configuration in which a thermoplastic resin film, a colored layer, and a semi-cured hard coat layer are layered, in this order.

Next, the thermoplastic resin film 11 used for the paint substitute film 1 in the disclosure will be described.

The thermoplastic resin film 11 in the disclosure is preferably at least one selected from the group consisting of a polyolefin resin, a polyamide resin, an acrylic resin, a polyester resin, a polycarbonate resin, and a polyarylene sulfide resin. Here, it is preferable to carry out denaturalization by copolymerization and modification by blending of resins, if necessary, from the viewpoint of improving the moldability or durability. The thermoplastic resin film in the disclosure is preferably a resin of which at least 50% by mass, with respect to the mass of the film, is selected from the group consisting of the resins listed above.

The thickness of the thermoplastic resin film 11 in the disclosure is preferably from 10 µm to 250 µm. It is preferable that the thickness of the thermoplastic resin film 11 is larger than the lower limit, because there is a possibility that the resin flows due to an injection pressure or a temperature of an injected resin in a case in which the thermoplastic resin film 11 is used as an adhesive of the resin member, or in order to prevent even a side of the film that is opposite to a side facing the metal from being instantaneously heated due to a heating temperature of the steel plate during lamination in a case in which the thermoplastic resin film 11 is used on the steel plate of the metal member. On the other hand, the thickness of the thermoplastic resin film 11 is preferably 250 µm or less from the viewpoint of productivity in film formation and stress during molding. The lower limit of the thickness of the thermoplastic resin film 11 is preferably 12 µm, more preferably 20 µm, and particularly preferably 25 µm, and the upper limit of the thickness is preferably 188 µm, more preferably 125 µm, and particularly preferably 100 µm.

Figure 3:
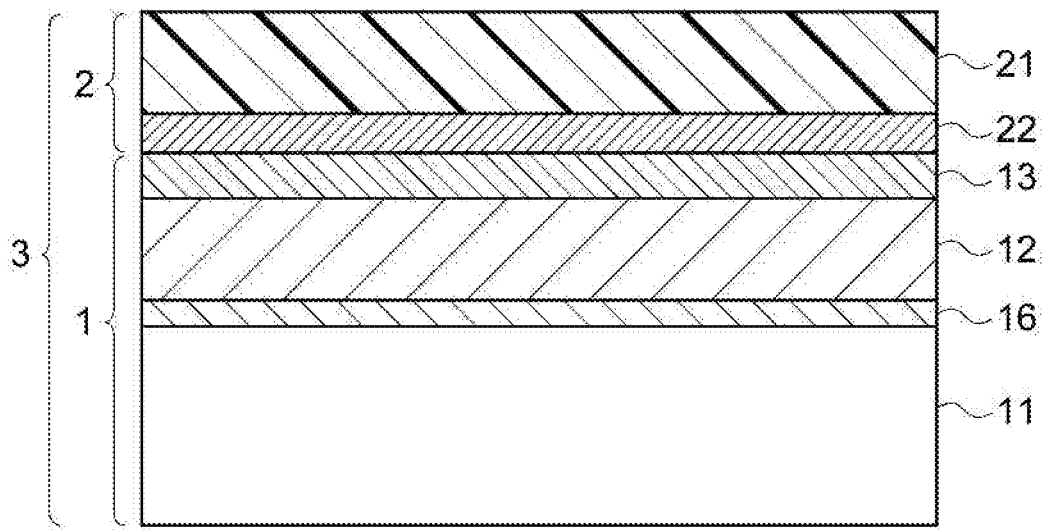
FIG. 3 is a partially enlarged cross-sectional view of a laminated body in which another paint substitute film and the protective film used in the disclosure are layered.

The paint substitute film 1 in the disclosure includes at least the colored layer 12 in addition to the thermoplastic resin film 11 described above. A method of forming the colored layer 12 is not particularly limited, but a method in which the colored layer 12 is layered by coating is simple and preferable. Adhesion between the colored layer 12 and the thermoplastic resin film 11 can be adjusted, if appropriate, depending on the type of thermoplastic resin film or a binder resin used for the colored layer. Here, it is preferable that a surface treatment is performed on the thermoplastic resin film by coating to provide the surface-modified layer 16 on a side of the thermoplastic resin film 11 that faces the colored layer which enhances the adhesion as shown in FIG. 3. The thermoplastic resin film is not particularly limited as long as the adhesive force can be secured by the thermoplastic resin film itself, and other layers may be layered.

The paint substitute film 1 may include a surface-modified layer provided on a surface of the thermoplastic resin film 11 in order to introduce affinity or chemical bonding at an adhesive interface. In a case in which the thermoplastic resin film 11 in the paint substitute film 1 includes the surface-modified layer 16, the thickness of the surface-modified layer 16 is preferably 500 nm or less, more preferably 200 nm or less, and still more preferably 100 nm or less, from the viewpoint of ensuring productivity and durability. In addition, from the similar viewpoint, the thickness of the surface-modified layer 16 is preferably 5 nm or more, more preferably 20 nm or more, and still more preferably from 20 nm to 100 nm. The surface-modified layer 16 may be provided through in-line coating in which coating is performed during formation of the thermoplastic resin film, or the thermoplastic resin film may be once wound into a roll after being formed, and then unwound again to perform off-line coating.

Note that a function of the surface-modified layer is not particularly limited as long as the thickness of the surface-modified layer is within the above range, and includes, for example, an adhesive function.

A component of the surface-modified layer 16 in the disclosure preferably includes a binder resin capable of securing the adhesive force between the colored layer and the thermoplastic resin film, and the binder resin more preferably includes at least one resin selected from the group consisting of a polyester resin, an acrylic resin, and a urethane resin. In order to adjust the adhesive force, it is possible to suitably carry out copolymerization of each resin or perform blending of different resins to improve the adhesive force.

The thermoplastic resin film 11 in the disclosure may have a monolayer structure or a multilayer structure. In a case in which the thermoplastic resin film 11 has the monolayer structure, it is possible to secure an adhesive force in a thickness direction by controlling melting, and cooling and solidification of the same resin. On the other hand, in a case in which the thermoplastic resin film 11 has the multilayer structure, as another resin is used, for example, it is possible to change a temperature in melting in the thickness direction, adjust the temperature of the injection resin of the resin member, and enable work at a lower temperature at the time of lamination on the steel plate used for the metal member.

The semi-cured hard coat layer 13 used for the paint substitute film 1 in the disclosure is in a semi-cured state as the word implies. The term "semi-cured" in the disclosure means that a curing reaction of a hard coat resin has not completely progressed, and does not mean that the degree of curing is half. The hard coat resin used for the semi-cured hard coat layer 13 in the disclosure is preferably a thermosetting resin. In particular, examples of the hard coat resin preferably include an acrylic resin for weather resistance, scratch resistance, and transparency.

The hard coat resin used for the semi-cured hard coat layer 13 in the disclosure is preferably layered on the thermoplastic resin film 11 by coating. A method of coating the hard coat resin may be a known coating method, and it is preferable that the hard coat resin is wound into a roll in a semi-cured state. When the hard coat resin is dried, a primary reaction proceeds by heat, such that the hard coat resin becomes a coating film in a semi-cured state, and can thus be wound. The semi-cured hard coat layer 13 is designed so that a secondary reaction then proceeds, that is, the reaction proceeds at a temperature higher than a temperature in the drying described above, thereby making it possible to allow a change in the degree of effect, that is, a change from the semi-cured state to a cured state by heat at the time of molding the member.

It is preferable that the thickness of the semi-cured hard coat layer 13 in the disclosure after drying is from 5 μm to 50 μm. As the thickness of the semi-cured hard coat layer 13 is 5 μm or more, less resin material is used and thus economical efficiency is excellent. In addition, it is possible to maintain, at a high level, protection performance against a damage to the colored layer or the thermoplastic resin film at an inner side, or a completed member, and against chemicals. Meanwhile, as the thickness is 50 μm or less, the semi-cured hard coat layer is excellent in terms of gloss and protection performance. From the above viewpoint, the lower limit of the thickness of the semi-cured hard coat layer 13 is preferably 10 μm or more, and more preferably 15 and the upper limit of the thickness is preferably 40 μm or less, and more preferably 35 μm or less.

Further, the semi-cured hard coat layer 13 in the disclosure may have a monolayer structure or a multilayer structure. For example, in the case of performing coating with the same resin twice to form multiple layers, it is possible to adjust the degree of curing by making drying conditions different, and as a result, it becomes easier to secure the adhesion to the protective film 2 described below or it is possible to suppress a transfer from the protective film 2. In addition, as the semi-cured hard coat layer 13 is formed as a multilayer within the above-described range, a glossy surface can be implemented.

The colored layer 12 included in the paint substitute film 1 in the disclosure may have a monolayer structure or a multilayer structure. The colored layer 12 preferably contains a binder resin and a coloring agent. In a case in which the colored layer 12 contains a binder resin, cracks (that is, fissures) caused by the degree of elongation at the time of molding can be suppressed, and an aesthetic appearance can be maintained. As a pigment or a dye is used as the coloring agent, a beautiful and excellent appearance can be formed. Such a coloring agent is preferably at least one selected from the group consisting of a carbon black (India ink) pigment, an iron black pigment, a titanium white pigment, an antimony white pigment, a chrome yellow pigment, a titanium yellow pigment, a Bengal red pigment, a cadmium red pigment, an ultramarine pigment, a cobalt blue pigment, a quinacridone red pigment, an isoindolinone yellow pigment, a phthalocyanine blue pigment, an aluminum pigment, a brass pigment, a titanium dioxide pigment, and a pearlescent pigment. The use of other pigments or additives for toning is a preferred aspect as long as the disclosure is not impaired.

[Laminated Body]

The laminated body 3 in the disclosure includes the above-described paint substitute film and the protective film 2 that is bonded to a surface of the paint substitute film where the semi-cured hard coat layer is present. That is, the laminated body 3 in the disclosure is formed by bonding a thermoplastic resin film 21 (referred to as protective film) including a release layer 22 having a release property on a surface of the semi-cured hard coat layer 13, which is the outermost surface in the above-described configuration of the paint substitute film.

[Protective Film]

In the disclosure, the thermoplastic resin used for the protective film 2 preferably shows a main peak of a ratio between a storage modulus and a loss modulus in dynamic viscoelasticity measurement at a temperature of 80° C. or higher. It is preferable that the protective film 2 in the disclosure has a function of protecting the semi-cured hard coat layer 13 and keeps the appearance beautiful even after molding. The protective film 2 preferably has heat resistance and surface smoothness at a high temperature from the viewpoint of withstanding a drying heat of a coated surface and the passage of a coating material through a drying oven. From the viewpoint of the heat resistance and surface smoothness at a high temperature, the thermoplastic resin used for the protective film 2 preferably shows the main peak of the ratio (tan δ) between the storage modulus and the loss modulus in dynamic viscoelasticity measurement at a temperature of 80° C. or higher. In a case in which the temperature at which the main peak is shown is 80° C. or higher, the heat resistance can be easily obtained, and distortion of the film due to tension during transportation can be suppressed. Although the upper limit temperature is not particularly set, it is preferable that the upper limit temperature is a temperature at which wrinkles that are easily generated when the protective film 2 is laminated can be suppressed.

From these viewpoints, as a preferred aspect of the protective film 2 used in the disclosure, the thermoplastic resin film 21 is preferably formed of a polyester resin. Particularly preferably, the protective film 2 is formed of the same type of resin as that of the thermoplastic resin film 11.

Further, the thickness of the protective film 2 is preferably from 10 μm to 100 μm. The protective film 2 is discarded at a later stage, and thus as long as the function thereof can be performed, it is preferable that the protective film 2 has an excellent economical efficiency. Therefore, the upper limit of the thickness is preferably 100 μm or less from the viewpoint of economical efficiency. In addition, since a surface appearance of the semi-cured hard coat layer to be bonded can be kept beautiful by securing stiffness of the protective film 2, it is preferable that the lower limit of the thickness is 10 μm or more from the viewpoint of securing the stiffness. The lower limit of the thickness is more preferably 25 μm or more, and particularly preferably 38 μm or more, and the upper limit of the thickness is preferably 75 μm or less, and particularly preferably 50 μm or less.

The release layer 22 of the protective film 2 is preferably formed of a resin having a small surface energy, and a release layer formed of a silicone resin or a fluororesin can be preferably exemplified. It is preferable that the protective film 2 includes a release layer formed of a silicone resin, because the release layer can be used at low costs.

As for the surface roughness of the protective film 2, the surface roughness of a surface of the protective film 2 that comes into contact with the semi-cured hard coat layer is preferably in a range of from 1 nm to 1000 nm in order to prevent the transportability of the protective film 2 and the poor appearance due to a base transfer to the semi-cured hard coat layer. In a case in which the surface roughness is within the above range, the transportability and handleability of the protective film 2 are excellent. The lower limit of the surface roughness of the surface of the protective film 2 that comes into contact with the semi-cured hard coat layer is preferably 3 nm or more, and more preferably 10 nm or more, and the upper limit thereof is preferably 800 nm or less, and more preferably 500 nm.

In addition, since the protective film 2 is bonded to the semi-cured hard coat layer 13 where the reaction has not yet progressed, it is preferable that the protective film 2 does not have a reactive component to suppress a poor appearance after the bonding of the protective film 2, in addition a physical shape transfer. Specifically, in a case in which, for example, a silicone resin is used as the release layer 22, a residual amine value measured with respect to a silicone resin dried film (1 g) that has been subjected to a drying treatment so as to match the amount of heat when the selected silicone resin is applied to the protective film 2 is preferably 50 mg or less, more preferably 40 mg or less, and still more preferably 20 mg or less, as a result of which the reactive component can be reduced. In a case in which the residual amine value is within the above range, crosslinking by a residual amine group of the release layer 22 suppresses the reaction with the semi-cured hard coat layer, thereby making it possible to prevent heavy release at the time of releasing the protective film 2 and maintaining the appearance.

Next, the in-mold molding, the thermocompression bonding, and the press-molding used in the producing method of the disclosure will be described in detail below.

[In-Mold Molding]

In the method of producing a resin member of the disclosure, the paint substitute film is inserted into a mold or the like, and the molten resin is injection-molded to perform the in-mold molding. Here, the semi-cured hard coat layer is cured until the in-mold molding ends, that is, the semi-cured hard coat layer is cured using the heat of the in-mold molding, or after the insertion into the mold, the heat is applied to cure the semi-cured hard coat layer, and then the in-mold molding is performed.

Hereinafter, the in-mold molding will be described in detail.

First, the resin used for the injection-molding is preferably at least one selected from the group consisting of a polyolefin resin, a polyamide resin, a polycarbonate resin, and a polyphenylene sulfide resin, and particularly preferably a polyolefin resin. Among polyolefin resins, a polypropylene resin is preferred from the viewpoints of strength, chemical resistance, and lightness required for an exterior part of a vehicle. In order to satisfy characteristics as a molded member, it is preferable to carry out copolymerization of a reinforcing fiber or additive with the resin, or the resin itself, or blend the resin with another resin, as long as the object of the disclosure is not impaired.

In the injection-molding, a sheet is placed so as to be in contact with the mold, the resin is injected from a gate, and the resin is cooled and solidified, thereby completing the injection-molding. Here, the resin injected from the gate is in a molten state and has heat corresponding to a melting point of the resin used. The thermoplastic resin film that comes into contact with the resin to be injected has an appropriate thickness to thereby prevent the thermoplastic resin film from being melted by the heat and affecting a pigment layer such as the colored layer even after the melting. Due to the heat of the injected resin, the thermoplastic resin film 11 of the laminated body 3 is partially melted in the thickness direction, and is cooled and solidified after interfacial mixing, thereby enabling molding with a strong adhesive force. It is preferable that the mold for the injection-molding is used after being cooled at a low temperature as long as the appearance of the laminated body 3 is not impaired, similarly to the melting temperature of the resin to be injected.

[Thermocompression Bonding]

The steel plate is usually wound into a roll, and the laminated body can also be made into a product as a roll-shaped laminated body. Therefore, in a case in which the steel plate and the laminated body each having a roll shape are used, roll-to-roll lamination can be performed. For example, the steel plate may be heated to be thermally bonded to a side of the supplied laminated body 3 on which the thermoplastic resin film 11 is present, thereby bonding the film to the steel plate. Here, it is preferable that the paint substitute film is cooled from the protective film 2 side when bonding the surface of the thermoplastic resin film of the paint substitute film to the heated steel plate in order to end the melting, and cooling and solidification in the thermoplastic resin film 11. Specifically, it is preferable that the temperature of a laminate roll at the time of bonding the laminated body 3 is kept low enough not to melt the thermoplastic resin film 11.

In other words, as the laminated body 3 is interposed, a side of the laminated body 3 adjacent to the steel plate is in a heated state, and a side of the laminated body 3 adjacent to the protective film 2 is in a cooled state, thereby making it possible to complete the melting, and cooling and solidification in the thermoplastic resin film, and interfacial mixing is carried out in the molten resin, thereby making it possible to further improve the adhesive force.

Figure 2:
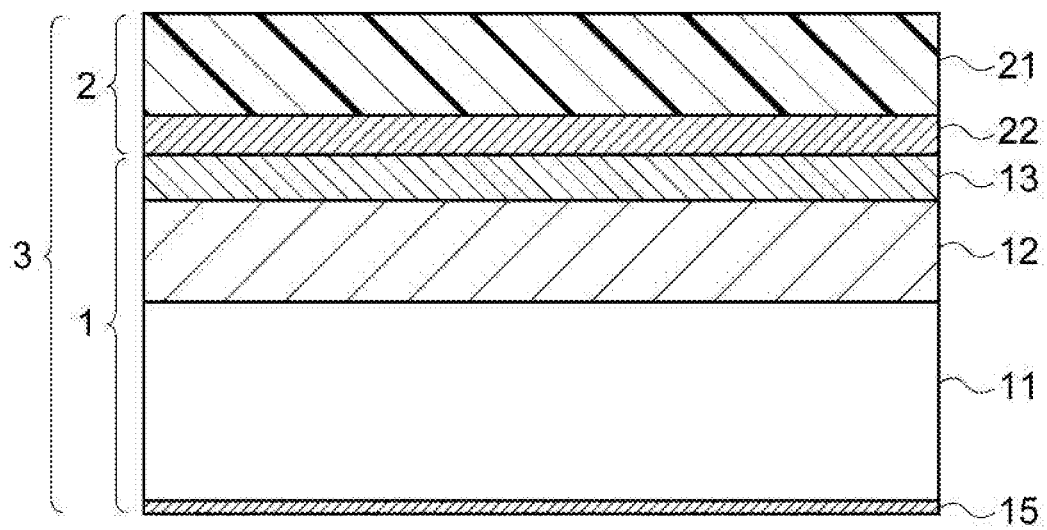
FIG. 2 is a partially enlarged cross-sectional view of a laminated body in which another paint substitute film and the protective film used in the disclosure are layered.

In addition, in order to further improve the adhesive force, as shown in FIG. 2, it is also preferable to provide the surface-modified layer 15 on a side adjacent to the steel plate or a side (non-colored layer side) adjacent to the thermoplastic resin film.

An iron plate used for the thermocompression bonding may be any one used for an exterior of a vehicle. In general, a steel material having an excellent moldability and a thickness of from about 0.3 mm to 0.6 mm is used, and thus it is preferable to use such a grade. Further, it is preferable that the steel material used for an exterior of a vehicle is subjected to zinc alloy plating as a rustproof treatment.

[Press-Molding]

A laminated steel plate in which the steel plate and the laminated body are integrated by the thermocompression bonding is press-molded. The press-molding is preferably cold pressing as described above. In performing cold press molding with the laminated steel plate, even in the case of stretch molding in which an end portion of the steel plate is held at a high pressure, or the case of molding in which the steel plate is held at a low pressure and is sucked by molding, the metal member can be covered by thermally fusion bonding the thermoplastic resin film 11 as described above.

The above contents will be described in more detail using the following Reference Examples, Examples, and Comparative Examples.

Reference Example 1

First, the thermoplastic resin film 11 was prepared in order to prepare the paint substitute film 1 in the laminated body 3. For the thermoplastic resin film 11, a polyethylene terephthalate resin 11A formed of a terephthalic acid as a dicarboxylic acid component and ethylene glycol as a glycol component, and a copolymerized polyethylene terephthalate resin 11B formed of a terephthalic acid and an isophthalic acid as dicarboxylic acid components and ethylene glycol as a glycol component were used. The resin 11A and the resin 11B were dried at 160° C. for 4 hours, supplied to separate extruders, respectively, layered in two layers using a feed block, and melt-extruded into a sheet from a die. After the extrusion into a sheet, the sheet was vitrified with a cooling roll, and stretched longitudinally at 90° C. Then, opposite surfaces of the sheet were coated with an acrylic resin by using a reverse-type roll coater. Next, the sheet was stretched laterally at 100° C., and a thermoplastic resin film 11 stretched at a stretch ratio of 11 times was wound into a roll.

The thermoplastic resin film 11 was unwound, and the colored layer 12 was first applied by using a comma coater. For the colored layer 12, a solvent coating material containing 20% by mass of titanium particles as a pigment with respect to the total content including an acrylic urethane-based resin as a binder component was used. The content of a nonvolatile component in the solvent coating material was 35% by mass. The coating was performed to a thickness of 20 and the film was dried in a drying oven at 90° C. and wound.

<Hard Coat Material (HC-1)>

150 parts of methyl isobutyl ketone (MIBK) was charged into a four-necked flask equipped with a cooling tube, a stirrer, a thermometer, and a nitrogen inlet tube, and the temperature was raised while stirring under a nitrogen atmosphere. The temperature in the flask was raised to 74° C., and maintained as a synthesis temperature, and a monomer solution obtained by mixing 3 parts of methyl methacrylate, 82.54 parts of n-butyl methacrylate, 12.85 parts of 4-hydroxybutyl acrylate, and 0.61 parts of methacrylic acid, 1 part of FANCRYL FA-711MM (manufactured by Hitachi Chemical Co., Ltd., pentamethylpiperidyl methacrylate), and 0.1 parts of azobisisobutyronitrile was added dropwise over 2 hours. One hour after the completion of the dropping of the monomer, 0.02 parts of azobisisobutyronitrile was added every hour to continue the reaction, and the reaction was continued until the unreacted monomer in the solution became 1% or less. Once the unreacted monomer became 1% or less, the reaction was terminated by cooling, and an acrylic copolymer solution having a solid content of about 40% was obtained. To the acrylic copolymer solution, 59.9 parts by mass (solid mass) of DURANATE "P301-75E" (manufactured by Asahi Kasei Corporation, polyisocyanate form of hexamethylene diisocyanate, hereinafter referred to as curing agent 1) as a polyisocyanate compound was added, and methyl isobutyl ketone (MIBK) was further added thereto so that the solid content became 30%, followed by stirring to obtain a hard coat material (HC-1).

A raw material coated with the colored layer 12 was unwound again, and subsequently, a 30% hard coat material (HC-1) with a nonvolatile component prepared as above was applied by using a comma coater so that the thickness after curing was 15 μm, and then sufficiently dried in a drying oven at 90° C. to form the semi-cured hard coat layer 13. Next, a biaxially stretched film formed of a polyethylene terephthalate resin was used as the protective film 2 and laminated, and the laminated body was wound into a roll to obtain the laminated body 3 including the paint substitute film 1 and the protective film 2. The protective film 2 of the obtained laminated body 3 was peeled off, and the color difference was evaluated. The result was as shown in Table 1.

Reference Example 2

The laminated body 3 including the paint substitute film 1 and the protective film 2 obtained as above was laminated on a plated steel plate JAC270F45/45 to prepare a laminated steel plate. Specifically, the laminated body 3 was unwound (that is, unrolled), and the plated steel plate was heated to 270° C. and introduced, a laminate roll is brought to room temperature, and thermocompression bonding between a side of the paint substitute film 1 in the laminated body 3 on which the resin 11B is present, and the plated steel plate was performed for lamination. The steel plate after the lamination was immediately introduced into cooling water and cooled to obtain a laminated steel plate. The protective film 2 of the laminated steel plate was peeled off, and the color difference was evaluated. The result was as shown in Table 1.

Example 1

Cold press molding was performed using the laminated steel plate obtained as above. Drawing was performed at room temperature (25° C.) so that a maximum degree of metal molding was 20% by using a mold for a door handle portion as the shape of an outer plate of an automobile. A grid of 10 mm squares was drawn on the film, and after confirming that the film after the molding had a degree of molding of at most 20%, press-molding using the laminated steel plate was performed. After the press-molding, the protective film 2 was peeled off, and a result of evaluating the physical properties is summarized in Table 1.

Example 2

Insert molding was performed using the laminated body 3 including the paint substitute film 1 and the protective film 2 obtained as above. The laminated body 3 was preliminarily brought into close contact with a plate-shaped mold under reduced pressure, and a polycarbonate resin was extruded from an injection-molding machine to perform integral molding. After the insert molding, the protective film 2 was peeled off, and a result of evaluating the physical properties is summarized in Table 1.

Comparative Example 1

Molding was performed in the similar manner to that in Example 1 except that the protective film 2 was peeled off before performing the cold press molding. A result of evaluating the physical properties of the obtained metal member is summarized in Table 1.

Comparative Example 2

The laminated body 3 including the paint substitute film 1 and the protective film 2 obtained as above was used. An adhesive layer was applied to a surface of the thermoplastic resin substrate on a side that is opposite to that on which the semi-cured hard coat layer is present by using a comma coater to a thickness of 20 μm, dried in a drying oven at 90° C., and wound while being laminated with the protective film 2 before winding to obtain a paint substitute film with an adhesive. After peeling off the protective films 2 on both sides of the paint substitute film with an adhesive, the paint substitute film was set on a three dimensional overlay method (TOM) molding machine manufactured by Fu-se Vacuum Forming Ltd., and heated to 140° C. while reducing the pressure, a resin substrate formed of an acrylonitrile-butadiene-styrene (ABS) resin was inserted, the pressure was returned to atmospheric pressure, and molding was performed. After the TOM molding, the protective film 2 was peeled off, and a result of evaluating the physical properties is summarized in Table 1.

TABLE 1

| Sample Name | | Reference Example 1 Paint Substitute Film | Reference Example 2 Laminated Steel Plate | Example 1 With Protection Cold Pressing Metal Member | Example 2 With Protection Insert Molding Resin Member | Comparative Example 1 Without Protection Cold Pressing Metal Member | Comparative Example 2 TOM Molding Resin Member |
|---|---|---|---|---|---|---|---|
| Paint Substitute Film | Protective Film | ○ (T|tan δ = 105° C.) | ○ (T|tan δ = 105° C.) | ○ (T|tan δ = 105° C.) | ○ (T|tan δ = 105° C.) | *** | *** |
| | Semi-cured Hard Coat | ○ (15 μm) | ○ (15 μm) | ○ (15 μm) | ○ (15 μm) | ○ (15 μm) | ○ (15 μm) |
| | Colored Layer | ○ (20 μm) | ○ (20 μm) | ○ (20 μm) | ○ (20 μm) | ○ (20 μm) | ○ (20 μm) |
| | Thermoplastic Resin | ○ (50 μ) | ○ (50 μ) | ○ (50 μ) | ○ (50 μ) | ○ (50 μ) | ○ (50 μ) |
| | Adhesive Layer | *** | *** | *** | *** | *** | ○ (20 μm) |
| Sample Position | Degree of Metal Molding | *** | *** | 20% | *** | 20% | *** |
| Appearance Evaluation | L* | 84.0 | 83.8 | 83.7 | 83.8 | 81.3 | 84.6 |
| | a* | −1.2 | −1.2 | −1.3 | −1.2 | −1.1 | −0.76 |
| | b* | 5.3 | 5.4 | 5.3 | 5.5 | 5.5 | 3.71 |
| | GR/60° | 107 | 119 | 106 | 104 | 88 | 72 |
| | ΔE | — | 0.2 | 0.3 | 0.2 | 2.7 | 1.8 |
| Maximum Adhesive Force | MPa | *** | 26.8 | 26.5 | 25.9 | 26.8 | 9.2 |
| Breaking Mode | — | *** | Film Broke | Film Broke | Film Broke | Film Broke | Adhesive Layer Broke |

Here, the results of Table 1 based on the metal member and the resin member obtained by the producing methods of the disclosure will be summarized. In the case of molding the metal member by cold press molding, in evaluating an aesthetic difference ΔE with respect to the paint substitute film of Reference Example 1, aesthetic differences ΔE of Example 1 with the protective film and Comparative Example 1 without the protective film were 0.3 and 2.7, respectively. In general, in a case in which ΔE is 1 or less, it is considered that the change in color is not visually recognizable, which can be considered as sufficiently satisfying the color tolerance of a currently used coated outer plate. It was found that the protective film suppressed a transfer due to the surface roughness of the mold, thereby reducing optical scattering and reducing color change.

Further, referring to the results of Reference Example 2, Example 1, and Comparative Example 1, the adhesive force of the laminated steel plate and the adhesive force of the metal member hardly changed regardless of the presence or absence of the protective film. It was found that the resin and the metal in Table 1 adhered firmly, and that sufficient stress relaxation acted on the degree of metal molding, which enabled coating with the paint substitute film that is not peeled off even during the molding.

Further, from the comparison between Example 2 and Comparative Example 2, it was found that the resin substrate bonded by film insert molding and the resin substrate bonded by TOM molding were different in appearance and breaking mode in a peel test. The color change ΔE of the insert-molded resin substrate is as small as 0.2 as compared with the original paint substitute film, but ΔE is largely changed in the TOM molding. It is presumed that this results from optical scattering due to formation of fine pores in the coating film caused by promotion of evaporation of a solvent remaining in a trace amount due to heating under reduced pressure, and it is presumed that the film insert molding is useful in that the adhering to the coating film is possible without bringing a sudden change. In addition, the insert-molded resin substrate immediately showed the maximum adhesive force immediately after the start of the peel test, and reached a breaking point without continuing to be peeled off thereafter. The breakage was the breakage of the paint substitute film. On the other hand, in the TOM molding article of Comparative Example 2, peeling continued after a peeling start point, and all the coating films were peeled off from the surface of the substrate without the breakage of the substrate film. From this, it was found that the breakage was cohesive breakage of the adhesive layer. The maximum value of the adhesive force is larger in Examples in which the thermocompression bonding was performed than in Comparative Example 2, and since the peeling does not continue, it is easy to obtain the effect that, even in a case in which the coating is peeled off, the peeling does not progress outside a region corresponding thereto.

As a result of conducting such an experiment, the metal member and the resin member that have an adhesive function by thermocompression bonding show a greater adhesive force than the adhesive force in the case of using an adhesive, and the aesthetic appearance after molding that is equivalent to that of a painted product was preserved. In addition, as shown in the cold press molding of the metal member, the aesthetic appearance inside the laminated body could be maintained by simultaneously molding the protective film.

Note that the degree of metal molding described in Table 1 above is represented by an enlargement ratio of the length of one side of a 10 mm square drawn on the paint substitute film. L*, a*, b*, GR/60° and ΔE in the appearance evaluation described in Table 1 represent results obtained by measurement of reflected light of an n–45° method using SE6000 manufactured by NIPPON DENSHOKU INDUSTRIES CO., LTD. as a measuring device. ΔE in Table 1 was obtained by the following Formula (1) using L*, a*, and b* of each of Reference Example 2, Examples, and Comparative Examples as L*1, a*1, and b*1, based on L*, a*, and b* of the paint substitute film of Reference Example 1.

$$\Delta E=\{(L^{*}-L^{*}1)2+(a^{*}-a^{*}1)2+(b^{*}-b^{*}1)2\}(\tfrac{1}{2})\quad\text{Formula (1)}$$

The maximum value of the adhesive force in Table 1 represents the maximum value (MPa) in a case in which the adhesive force test in which a test piece having a width of 20 mm is used and peeling is performed in a 180° direction at a peeling speed of 50 mm/min under an atmosphere of 25° C. was conducted, and the breaking mode in Table 1 represents a broken portion after the peeling.

INDUSTRIAL APPLICABILITY

The above embodiment has been described as being applied to parts of an automobile or the like. However, the disclosure is not limited thereto, and for example, the paint substitute film 1 may also be used for a vehicle (a motor-cycle, a truck, or the like) other than an automobile, a ship (a motor boat or the like), a home appliance, a stereo product, a construction member, a steel plate product, or the like.

REFERENCE SIGNS LIST

1 Paint substitute film
11 Thermoplastic resin film
12 Colored layer
13 Semi-cured hard coat layer
14 Adhesive layer
15 Surface-modified layer (non-colored layer side)
16 Surface-modified layer (colored layer side)
17 Antifouling layer
18 Bright-material layer
19 Clear layer
2 Protective film
21 Thermoplastic resin film
22 Release layer
3 Laminated body The disclosure of Japanese Patent Application No. 2017-203464 filed on Oct. 20, 2017 is incorporated herein by reference in its entirety.

All documents, patent applications, and technical standards mentioned herein are incorporated herein by reference to the same extent as if each individual document, patent application, and technical standard were specifically and individually stated.

The invention claimed is:

1. A method of producing a metal member, which is used as an exterior part of a vehicle, the method comprising:
a molding step of:
by using a laminated body including a paint substitute film that includes a thermoplastic resin film, a colored layer, and a semi-cured hard coat layer, in this order, and a protective film that is bonded to a surface of the semi-cured hard coat layer, and using a steel plate,
performing thermocompression bonding on the laminated body and the steel plate, which has been heated, and performing press-molding while curing the semi-cured hard coat layer.

2. The method of producing a metal member according to claim 1, wherein, in the molding step, a side of the laminated body on which the paint substitute film is present is bonded to the heated steel plate by thermal fusion bonding.

3. The method of producing a metal member according to claim 1, wherein, in a case of bonding a side of the paint substitute film on which the thermoplastic resin film is present to the heated steel plate, the paint substitute film is cooled from a protective film side.

4. A method of producing a resin member, which is used as an exterior part of a vehicle, the method comprising:
by using a laminated body including a paint substitute film that includes a thermoplastic resin film, a colored layer, and a semi-cured hard coat layer, in this order, and a protective film that is bonded to a surface of the semi-cured hard coat layer, and using a molten resin,
inserting the laminated body into a mold, performing in-mold molding by performing injection-molding using the molten resin, and curing the semi-cured hard coat layer after insertion into the mold and until the in-mold molding ends.

5. The method of producing a resin member according to claim 4, wherein a resin injected in the injection-molding is at least one selected from the group consisting of a polyolefin resin, a polyamide resin, a polycarbonate resin and a polyphenylene sulfide resin.

6. The method of producing a resin member according to claim 5, wherein the polyolefin resin includes a polypropylene resin.

7. A method of producing an exterior part of a vehicle, comprising:
combining a metal member produced by a method comprising:
a molding step of:
by using a laminated body including a paint substitute film that includes a thermoplastic resin film, a colored layer, and a semi-cured hard coat layer, in this order, and a protective film that is bonded to a surface of the semi-cured hard coat layer, and using a steel plate,
performing thermocompression bonding on the laminated body and the steel plate, which has been heated, and performing press-molding while curing the semi-cured hard coat layer, and
the resin member obtained by the method according to claim 4.

8. The producing method according to claim 1, wherein the protective film shows a main peak of a ratio (tan δ) between a storage modulus and a loss modulus in dynamic viscoelasticity measurement at a temperature of 80° C. or higher.

9. The producing method according to claim 1, wherein the semi-cured hard coat layer of the paint substitute film contains a thermosetting resin.

10. The producing method according to claim 9, wherein the thermosetting resin includes an acrylic resin.

11. The producing method according to claim 1, wherein the colored layer of the paint substitute film contains a binder resin and a coloring agent.

12. The producing method according to claim 11, wherein the coloring agent is at least one selected from the group consisting of a carbon black (India ink), an iron black pigment, a titanium white pigment, an antimony white pigment, a chrome yellow pigment, a titanium yellow pigment, a Bengal red pigment, a cadmium red pigment, an ultramarine pigment, a cobalt blue pigment, a quinacridone red pigment, an isoindolinone yellow pigment, a phthalocyanine blue pigment, an aluminum pigment, a brass pigment, a titanium dioxide pigment and a pearlescent pigment.

13. The producing method according to claim 1, wherein the thermoplastic resin film in the paint substitute film contains at least one selected from the group consisting of a polyolefin resin, a polyamide resin, an acrylic resin, a polyester resin, a polycarbonate resin and a polyarylene sulfide resin.

14. The producing method according to claim 13, wherein the thermoplastic resin film does not include an adhesive layer having a thickness of more than 1 μm.

15. The producing method according to claim 4, wherein the protective film shows a main peak of a ratio (tan δ) between a storage modulus and a loss modulus in dynamic viscoelasticity measurement at a temperature of 80° C. or higher.

16. The producing method according to claim 4, wherein the semi-cured hard coat layer of the paint substitute film contains a thermosetting resin.

17. The producing method according to claim 16, wherein the thermosetting resin includes an acrylic resin.

18. The producing method according to claim 4, wherein the colored layer of the paint substitute film contains a binder resin and a coloring agent.

19. The producing method according to claim 18, wherein the coloring agent is at least one selected from the group consisting of a carbon black (India ink), an iron black pigment, a titanium white pigment, an antimony white pigment, a chrome yellow pigment, a titanium yellow pigment, a Bengal red pigment, a cadmium red pigment, an ultramarine pigment, a cobalt blue pigment, a quinacridone red pigment, an isoindolinone yellow pigment, a phthalocyanine blue pigment, an aluminum pigment, a brass pigment, a titanium dioxide pigment and a pearlescent pigment.

20. The producing method according to claim 4, wherein the thermoplastic resin film in the paint substitute film contains at least one selected from the group consisting of a polyolefin resin, a polyamide resin, an acrylic resin, a polyester resin, a polycarbonate resin and a polyarylene sulfide resin.

* * * * *